Feb. 24, 1970 P. B. KOBEY 3,496,707
HINGED ROTARY MOWER HOUSING
Filed Jan. 15, 1968

INVENTOR
PHILIP B. KOBEY
BY
ATTORNEYS

United States Patent Office 3,496,707
Patented Feb. 24, 1970

3,496,707
HINGED ROTARY MOWER HOUSING
Philip B. Kobey, 4949 W. 72nd Ave.,
Westminster, Colo. 80030
Filed Jan. 15, 1968, Ser. No. 697,692
Int. Cl. A01d 67/00
U.S. Cl. 56—25.4
5 Claims

ABSTRACT OF THE DISCLOSURE

This invention relates to an improved housing for rotary mower blades characterized by a self-closing hinged portion that, in raised position, enables the user to cut tall weeds and the like that cannot be mowed effectively with the blade completely covered.

---

The ordinary commercially-available rotary mower employs a sheet metal housing raised a few inches above the ground that completely covers the blade. Under normal mowing conditions, such as cutting grass and other short ground cover, a completely enclosed blade is desirable from a safety standpoint as these blades turn at high speeds and can cause serious injury. Unfortunately, this type of housing has its disadvantages because it becomes very difficult, if not impossible, to mow the taller growths, like weeds, even though the cutting mechanism is entirely capable of handling this type of foliage. The reason these items cannot be cut successfully is, of course, the fact that the leading edge of the housing impinges thereagainst and the tendency is for the mower to ride up over the top thereof while doing little, if any, cutting. In the case of weeds with thick stalks, it becomes a practical impossibility to even push the mower through the growth unless, of course, they are cut ahead of the housing reaching same.

It has now been found in accordance with the teaching of the instant invention that this limitation of the prior art rotary mowers can be overcome by the simple, but unobvious expedient of hinging the front portion of the blade housing to expose the blade and enable same to sever the stalks of tall plants before the leading edge of the housing reaches same. To accomplish the latter objective without sacrificing the safety feature inherent in the use of a fully-covered blade, the hinged portion of the housing is spring-biased into closed position and the mechanism for raising same is located at the handle. For maximum safety, the mower should include no latch mechanism for holding the blade in raised position which means, of course, that the user will have to hold it open at all times and, in so doing, will be in no position to be injured thereby. Practically speaking, holding this hinged housing portion open for any great length of time can become quite tiresome, so a simple latch is desirable even though, admittedly, the unit is somewhat more dangerous to use.

It is, therefore, the principal object of the present invention to provide a novel and improved rotary lawnmower capable of cutting tall weeds.

A second objective is the provision of a unit of the type aforementioned that includes a hinged blade housing, a portion of which can be raised up to expose the blade.

Another object of the invention herein disclosed and claimed is to provide a hinged mower housing that is spring-biased into closed position for greater safety.

Still another objective is to provide a hinged mower housing with a remotely-located activating mechanism that further insures that the user will be behind the mower whenever the blade is partially exposed.

An additional object is the provision of a modified mower housing design that can easily be adapted for use on nearly all of the commercially available rotary mowers.

A further object is to provide a housing for rotary mowers that is simple, inexpensive, rugged, versatile, lightweight, compact and easy to operate.

Other objects will be in part apparent and in part pointed out specifically hereinafter in connection with the description of the drawings that follows, and in which.

Figure 1:
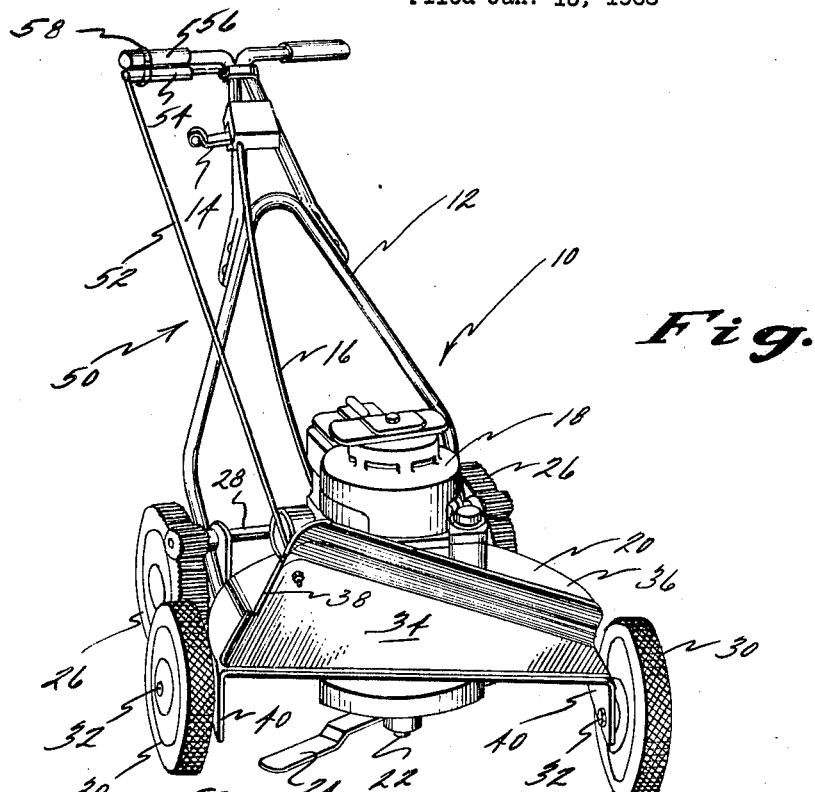
FIGURE 1 is a perspective view looking down and slightly to the right at the front end of a rotary mower equipped with the hinged housing of the present invention, the latter having been shown in raised position.
Figure 2:
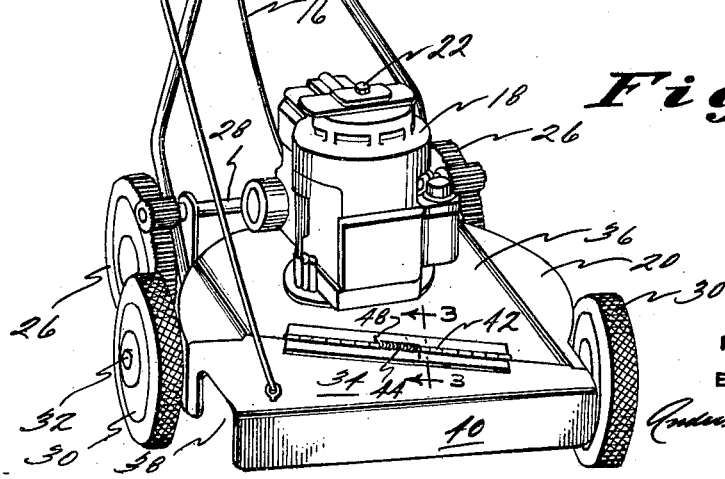
FIGURE 2 is a perspective view similar to FIGURE 1, except that the hinged portion of the housing has been shown lowered into closed position; and, FIGURE 3 is a fragmentary section to an enlarged scale showing the spring biasing the hinged portion of the housing into its normally-closed position.

Referring now to the drawings for a detailed description of the present invention and, initially, to FIGURES 1 and 2 for this purpose, reference numeral 10 has been selected to designate a rotary-type lawnmower in a general way and the latter will be seen to include a handle 12 carrying a hand throttle 14 operatively connected by cable 16 to an internal combustion engine 18 mounted atop housing 20. The motor has a vertically-disposed drive shaft 22 that extends down through the housing where it mounts a blade 24 for rotational movement in a substantially horizontal plane. The particular mower illustrated has a pair of drive wheels 26 journalled for rotation at the rear of the housing and operatively connected to the engine 18 by means of a low-speed shaft 28. Additional freely-rotatable wheels 30 are mounted on short stub shafts 32 that are attached to the sides of the blade housing 20.

The instant invention involves only housing 20 and the means by which the hinged portion or lid 34 thereof is raised and lowered; therefore, it is to be understood that the remaining features of the mower are intended as being merely illustrative of the general type of rotary lawnmower that may be modified to include said improved housing. Housing 20 includes a stationary portion 36 which mounts the engine and to which the wheels are attached together with a movable portion or lid 34 hingedly attached to the stationary portion for movement between a lower closed position suitable for ordinary lawn mowing and a raised open position partially exposing the blade for cutting tall weeds and the like. As illustrated, the movable lid portion 34 of the housing contains the side-opening discharge chute 38 formed in the conventional downturned blade-protecting skirt 40.

A piano-type hinge 42 has been shown interconnecting the stationary and movable portions of the housing together so that the latter can be moved from its closed position shown in FIGURE 2 to its open position of FIGURE 1. The joint between these stationary and movable housing sections must, of course, be far enough back so that the blade is exposed forwardly thereof and can engage and sever the stalks of large plants prior to their coming into contact with the housing.

Figure 3:
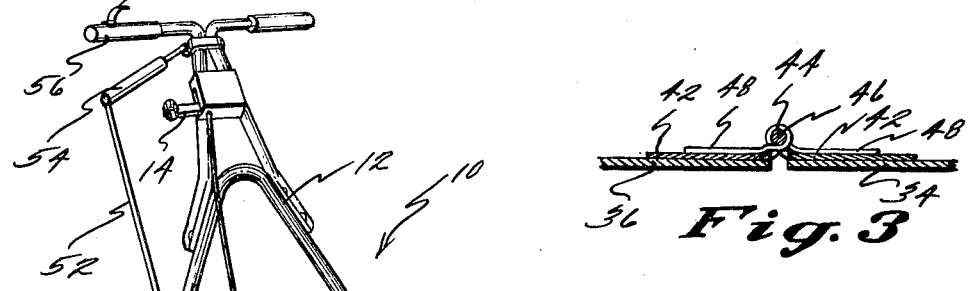

Now, in connection with FIGURES 2 and 3, it will be seen that the hinged connection between the housing sections 34 and 36 is provided with a spring 44 that is coiled about the hinge pin 46 with the legs 48 thereof projecting out over the surfaces of the adjoining hinge leaves so as to normally bias the movable lid-forming housing section toward its closed position. Here again, spring 44 is intended as being merely illustrative of one such type of spring that can be used to perform this function.

Referring once again to FIGURES 1 and 2, reference will now be made to the lid-elevating means that has been indicated in a general way by numeral 50 and which enables the lid-forming portion 34 of the housing to be actuated from a remote location behind the mower. This lid-elevating means comprises a cable 52 having its lower extremity attached to the lid 34 at a point spaced well forwardly of the hinge and its rear end attached to a pivoted handle 54 at a point remote from the pivotal connection of the latter to the main mower handle. Handle 54 moves in a plane parallel with one of the stationary mower handle handgrips 56 from a released position angularly-disposed relative thereto and an operative position in essentially parallel contacting relation. Thus, the operator merely grasps the pivoted handle 54 and pulls it toward him up against the stationary handgrip 56 to raise the lid and expose blade 24. In the preferred form of the invention, no latch is used to fasten elements 54 and 56 together; thus, the operator must always be in position behind the mower to raise the lid or spring 44 that will move the latter into its closed position. If desired, a simple latch may be used, the one illustrated consisting of nothing more than a simple hook 58 that is mounted in the handgrip for movement over the handle to retain same in parallel operative relation.

Having thus described the several useful and novel features of the rotary mower housing of the present invention, it will be apparent that the several worthwhile objectives for which it was developed have been achieved. Although but a single specific embodiment has been illustrated, I realize that certain changes and modifications therein may well occur to those skilled in the art within the broad teaching hereof.

What is claimed is:

1. In a rotary lawnmower of the type having a wheel-supported frame, a handle attached to the rear end of the frame, drive means mounted atop the frame having a vertically-disposed drive shaft, and a blade attached to the drive shaft for movement in a horizontal plane, the improvement which comprises: a stationary housing member surrounding the drive means in horizontal position above the blade, said stationary housing member covering both sides and the rear of the path described by the rotating blade while terminating short thereof along the front so as to expose same from above; and, a movable housing member hingedly attached to the front edge of the stationary housing member for movement about a horizontal axis between a raised position exposing the front of the blade path from above and a lowered position covering the latter.

2. The improvement as set forth in claim 1 which includes: spring means interconnecting the stationary and movable housing members operative to normally bias the latter into its lowered position.

3. The improvement as set forth in claim 1 which includes: lanyard means having the lower end attached to the movable housing member forwardly of the hinged connection and the rear end terminating at the mower handle, said lanyard means being operative when pulled upon by the operator standing behind the mower to raise said movable housing member in opposition to the bias exerted thereon by the spring so as to expose the blade.

4. The improvement as set forth in claim 3 which includes: handle means having one end pivotally attached to the mower handle and the other end to the upper end of the lanyard means, said handle means being positioned to be grasped by the operator when holding the mower handle, and said handle means being operative when pulled toward the operator to actuate the lanyard means so as to raise the movable housing element.

5. The improvement as set forth in claim 4 which includes: latch means carried by the mower handle in position to engage the handle means and releasably secure same in operative position.

References Cited

UNITED STATES PATENTS

| 2,578,880 | 12/1951 | Doyle | 56—25.4 |
|---|---|---|---|
| 2,877,618 | 3/1959 | Thornton-Trump | 56—25.4 |
| 3,430,421 | 3/1969 | Matthews | 56—23 |

ROBERT PESHOCK, Primary Examiner

JAMES A. OLIFF, Assistant Examiner